(12) United States Patent
Duan et al.

(10) Patent No.: US 12,183,040 B2
(45) Date of Patent: Dec. 31, 2024

(54) METHOD, APPARATUS AND SYSTEM FOR CALIBRATING PANORAMIC SURROUND VIEW SYSTEM

(71) Applicant: GREAT WALL MOTOR COMPANY LIMITED, Baoding (CN)

(72) Inventors: Fuhai Duan, Baoding (CN); Shuli Li, Baoding (CN); Bo Gao, Baoding (CN); Tong Gao, Baoding (CN); Hong Wei, Baoding (CN); Zhichao Fan, Baoding (CN); Dongchun Xu, Baoding (CN); Peng Hao, Baoding (CN); Bingxu Ma, Baoding (CN); Jianzhang Yang, Baoding (CN); Rongchang Xu, Baoding (CN); Chong Wang, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 302 days.

(21) Appl. No.: 17/758,144

(22) PCT Filed: Apr. 19, 2021

(86) PCT No.: PCT/CN2021/088125
§ 371 (c)(1),
(2) Date: Jun. 29, 2022

(87) PCT Pub. No.: WO2021/213326
PCT Pub. Date: Oct. 28, 2021

(65) Prior Publication Data
US 2023/0032613 A1    Feb. 2, 2023

(30) Foreign Application Priority Data
Apr. 20, 2020   (CN) .......................... 202010312448.2

(51) Int. Cl.
*G06T 7/80*        (2017.01)
*G06T 3/4038*      (2024.01)

(52) U.S. Cl.
CPC .............. *G06T 7/80* (2017.01); *G06T 3/4038* (2013.01); *G06T 2207/30252* (2013.01)

(58) Field of Classification Search
CPC ......... G06T 2207/30252; G06T 3/4038; G06T 7/80
See application file for complete search history.

(56) References Cited

U.S. PATENT DOCUMENTS 11,431,990 B2 *  8/2022  Gosling ................ H04N 19/17
2009/0299684 A1 * 12/2009 Imanishi .............. H04N 17/002
                                                        702/150
(Continued)

FOREIGN PATENT DOCUMENTS

CN       103247030       8/2013
CN       104240258 A     12/2014
(Continued)

OTHER PUBLICATIONS

WIPO, International Search Report for PCT/CN2021/088125, Jul. 22, 2021.
(Continued)

*Primary Examiner* — Mohamed A. Wasel
(74) *Attorney, Agent, or Firm* — Hodgson Russ LLP

(57) ABSTRACT

The panoramic surround view system in the vehicle can control the projection device of the vehicle to project the preset pattern on the ground around the vehicle, acquire the plurality of target photographs including the preset pattern, and generate the target calibrating data of the surround view cameras according to the plurality of target photographs, so that the surround view cameras of the panoramic surround view system can be calibrated by using the target calibrating data to obtain the panoramic surround view image. There- (Continued)

fore, when the user needs to re-calibrate the calibrating data of the image splicing of the panoramic surround view system of the vehicle, the calibrating process can be completed by only by using the projection device of the vehicle, without using a special calibrating site and equipment, thus simplifying the calibrating operation steps and saving time.

16 Claims, 7 Drawing Sheets

(56) References Cited

U.S. PATENT DOCUMENTS

| | | | |
|---|---|---|---|
| 2010/0194886 A1 | 8/2010 | Asari et al. | |
| 2010/0245576 A1* | 9/2010 | Inui | G06T 7/80 |
| | | | 348/148 |
| 2014/0247354 A1 | 9/2014 | Knudsen | |
| 2016/0300113 A1* | 10/2016 | Molin | G06T 7/80 |
| 2016/0343136 A1 | 11/2016 | Heidi et al. | |
| 2017/0054974 A1 | 2/2017 | Pliefke | |
| 2017/0345159 A1 | 11/2017 | Aoyagi et al. | |
| 2018/0167551 A1* | 6/2018 | Koravadi | H04N 23/90 |
| 2019/0080476 A1* | 3/2019 | Ermilios | G06V 20/56 |
| 2019/0104278 A1* | 4/2019 | Ermilios | H04N 5/145 |
| 2019/0213756 A1* | 7/2019 | Chang | G06V 20/56 |
| 2020/0112675 A1* | 4/2020 | Arbeiter | G06T 15/205 |
| 2020/0134869 A1* | 4/2020 | Bamber | G06T 7/97 |
| 2021/0287402 A1* | 9/2021 | Krueger | G06T 7/80 |

FOREIGN PATENT DOCUMENTS

| | | |
|---|---|---|
| CN | 105608693 A | 5/2016 |
| CN | 107133988 | 9/2017 |
| CN | 108596982 A | 9/2018 |
| CN | 109509231 A | 3/2019 |
| CN | 109615660 | 4/2019 |
| CN | 110111393 | 8/2019 |
| CN | 110930457 | 3/2020 |
| CN | 111667538 | 9/2020 |

OTHER PUBLICATIONS

EPO, Extended European Search Report for EP Application No. 21793161.7, May 9, 2023.

* cited by examiner

When receiving a projection instruction sent by a surround view controller in a panoramic surround view system, controlling a projection device of a vehicle to project, and generating a preset pattern on the ground around the vehicle — 201

METHOD, APPARATUS AND SYSTEM FOR CALIBRATING PANORAMIC SURROUND VIEW SYSTEM

CROSS REFERENCE TO RELEVANT APPLICATIONS

The present disclosure is a U.S. national stage entry of International Application No. PCT/CN2021/088125, filed Apr. 19, 2021, which claims priority to Chinese Patent Application No. 20/201,0312448.2, filed Apr. 20, 2020, the entire disclosures of which are incorporated herein by reference.

TECHNICAL FIELD

The present disclosure relates to the technical field of vehicles, and more particularly, to a method, an apparatus and a system for calibrating a panoramic surround view system.

BACKGROUND

With the increase of vehicle holdings and the increasingly complex traffic environment, drivers have higher demands on functions and performances of parking assistance systems for safe parking operations. 360-degree panoramic surround view systems can provide drivers with 360-degree real-time images around the vehicle, thus eliminating blind spots of vision and making the parking process safer and more convenient.

The existing panoramic surround view system provides drivers with 360-degree real-time images around the vehicle by seamlessly splicing captured images acquired by a plurality of cameras around the vehicle body into a top view picture according to pre-calibrated camera parameters. Meanwhile, due to the errors in the manufacturing process of the cameras and the assembly process of the vehicle, in order to ensure the image splicing effect, one set of camera parameters cannot be used as calibrating data for different vehicles of the same vehicle type. Each vehicle needs to be calibrated separately, so as to determine calibrating data corresponding to each vehicle. The existing calibrating method is to set up a special calibrating scene in a vehicle production line or 4S store to calibrate the vehicle, which requires special calibrating sites and equipment, and requires high precision on the scene layout.

However, in the current solution, when the cameras of the panoramic surround view system or the state of the vehicle changes, and the customer needs to re-calibrate the calibrating data of the image slicing of the panoramic surround view system, it only takes a long time to go to the 4S store to calibrate the vehicle. At the same time, calibrating persons of the 4S store also need to spend more time to arrange the special calibrating site and equipment, which further causes the waste of time and persons.

SUMMARY

In light of this, the present disclosure aims to propose a method, an apparatus and a system for calibrating a panoramic surround view system, so as to solve a problem in the prior art that, when a user needs to re-calibrate calibrating data of image splicing of a panoramic surround view system of a vehicle, the user needs to go to a 4S store and uses a special calibrating site and equipment for calibrating, thus causing the waste of time and persons.

To achieve the above objects, the technical solutions of the present disclosure are implemented as follows:

A method for calibrating a panoramic surround view system applied to a surround view controller in the panoramic surround view system, includes:

when receiving a calibrating start-up operation, generating a projection instruction, and sending the projection instruction to a projection device control module in the panoramic surround view system;

controlling a plurality of surround view cameras to acquire images, and receiving a plurality of target photographs acquired by the plurality of surround view cameras, the plurality of target photographs including a preset pattern projected by a projection device of a vehicle on the ground around the vehicle;

generating target calibrating data of the surround view cameras according to the plurality of target photographs; and calibrating and splicing the plurality of target photographs according to the target calibrating data to obtain a panoramic surround view image and complete a calibrating operation of the panoramic surround view system.

A method for calibrating a panoramic surround view system applied to a projection device control module in the panoramic surround view system, includes:

when receiving a projection instruction sent by a surround view controller in the panoramic surround view system, controlling a projection device of a vehicle to project, and generating a preset pattern on the ground around the vehicle.

An apparatus for calibrating a panoramic surround view system applied to a surround view controller in the panoramic surround view system, includes:

a first generating module configured for, when receiving a calibrating start-up operation, generating a projection instruction, and sending the projection instruction to a projection device control module in the panoramic surround view system;

an acquisition module configured for controlling a plurality of surround view cameras to acquire images, and receiving a plurality of target photographs acquired by the plurality of surround view cameras, the plurality of target photographs including a preset pattern projected by a projection device of a vehicle on the ground around the vehicle;

a second generating module configured for generating target calibrating data of the surround view cameras according to the plurality of target photographs; and a calibrating module configured for calibrating and splicing the plurality of target photographs according to the target calibrating data to obtain a panoramic surround view image and complete a calibrating operation of the panoramic surround view system.

An apparatus for calibrating a panoramic surround view system applied to a projection device control module in the panoramic surround view system, includes:

a first projecting module configured for, when receiving a projection instruction sent by a surround view controller in the panoramic surround view system, controlling a projection device of a vehicle to project, and generating a preset pattern on the ground around the vehicle.

A system for calibrating a panoramic surround view system includes a surround view controller and a projection device control module, wherein the surround view controller and the projection device control module are in communication connection;

when receiving a calibrating start-up operation, the surround view controller generates a projection instruction, and sends the projection instruction to a projection device control module in the panoramic surround view system;

when receiving the projection instruction sent by the surround view controller in the panoramic surround view system, the projection device control module controls a projection device of a vehicle to project, and generates a preset pattern on the ground around the vehicle;

the surround view controller controls a plurality of surround view cameras to acquire images, and receives a plurality of target photographs acquired by the plurality of surround view cameras, the plurality of target photographs including the preset pattern projected by the projection device of the vehicle on the ground around the vehicle;

the surround view controller generates target calibrating data of the surround view cameras according to the plurality of target photographs; and the surround view controller calibrates and splices the plurality of target photographs according to the target calibrating data to obtain a panoramic surround view image and complete a calibrating operation of the panoramic surround view system.

Compared with the prior art, the method, the apparatus and the system for calibrating the panoramic surround view system according to the present disclosure have the following advantages:

The method, the apparatus and the system for calibrating the panoramic surround view system provided by the present disclosure include: when receiving the calibrating start-up operation, generating the projection instruction, and sending the projection instruction to the projection device control module in the panoramic surround view system; controlling the plurality of surround view cameras to acquire images, and receiving the plurality of target photographs acquired by the plurality of surround view cameras, the plurality of target photographs including the preset pattern projected by the projection device of the vehicle on the ground around the vehicle; generating the target calibrating data of the surround view cameras according to the plurality of target photographs; and calibrating and splicing the plurality of target photographs according to the target calibrating data to obtain the panoramic surround view image and complete the calibrating operation of the panoramic surround view system. In the present disclosure, the panoramic surround view system in the vehicle can control the projection device of the vehicle to project the preset pattern on the ground around the vehicle, acquire the plurality of target photographs including the preset pattern, and generate the target calibrating data of the surround view cameras according to the plurality of target photographs, so that the surround view cameras of the panoramic surround view system can be calibrated by using the target calibrating data to obtain the panoramic surround view image. Therefore, when the user needs to re-calibrate the calibrating data of the image splicing of the panoramic surround view system of the vehicle, the calibrating process can be completed by only by using the projection device of the vehicle, without using a special calibrating site and equipment, thus simplifying the calibrating operation steps and saving time.

The above description is merely a summary of the technical solutions of the present disclosure. In order to more clearly know the technical means of the present disclosure to enable the implementation according to the contents of the description, and in order to make the above and other objects, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the drawings that are required to describe the embodiments or the related art will be briefly introduced below. Apparently, the drawings that are described below are embodiments of the present disclosure, and a person skilled in the art can obtain other drawings according to these drawings without paying creative work.

Drawings constituting a part of the present disclosure here serve to provide a further understanding of the present disclosure, and the illustrative embodiments of the present disclosure and together with the description thereof serve to explain the present disclosure, and do not constitute inappropriate restriction to the present disclosure. In the drawings.

DETAILED DESCRIPTION OF THE EMBODIMENTS

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

It should be noted that, in case of no conflict, the embodiments in the present disclosure and the features in the embodiments may be combined with each other.

The present disclosure will be explained in detail with reference to the accompanying drawings and embodiments hereinafter.

Figure 1:
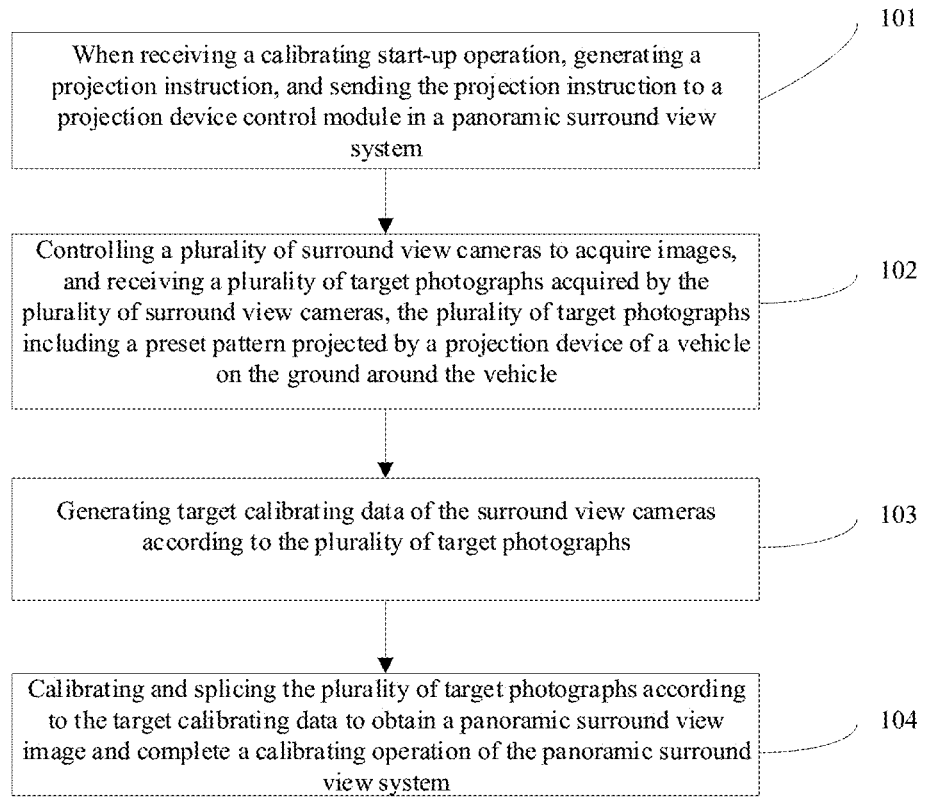
FIG. 1 is a flow chart of steps of a method for calibrating a panoramic surround view system according to an embodiment of the present disclosure.

Referring to FIG. 1, which illustrates a flow chart of steps of a method for calibrating a panoramic surround view system according to an embodiment of the present disclosure.

The method for calibrating the panoramic surround view system provided by an embodiment of the present disclosure is applied to a surround view controller in the panoramic surround view system.

Step 101: when receiving a calibrating start-up operation, generating a projection instruction, and sending the projection instruction to a projection device control module in the panoramic surround view system.

In this step, the surround view controller in the panoramic surround view system may, when receiving the calibrating start-up operation, generate the projection instruction, and send the projection instruction to a projection device control module in the panoramic surround view system.

Figure 2:
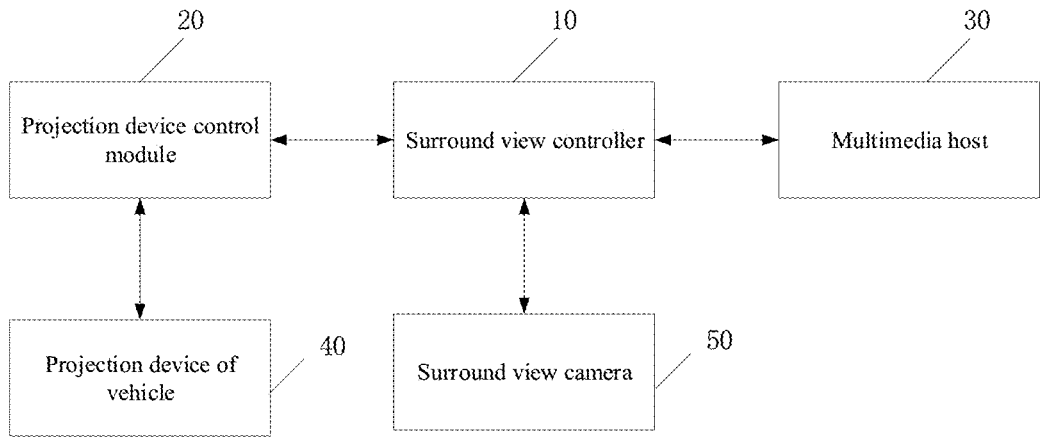
FIG. 2 is a schematic structural diagram of a panoramic surround view system according to an embodiment of the present disclosure.

Specifically, referring to FIG. 2, which illustrates a schematic structural diagram of the panoramic surround view system according to an embodiment of the present disclosure. The panoramic surround view system may include a surround view controller 10, a projection device control module 20, a multimedia host 30 of a vehicle, a projection device 40 of the vehicle, and a plurality of surround view cameras 50, wherein the surround view controller 10 may, when receiving the calibrating start-up operation, generate the projection instruction, and send the projection instruction to the projection device control module 20 for the projection device control module 20 to control the projection device 40 of the vehicle to project, thus generating a preset pattern on the ground around the vehicle.

The calibrating start-up operation may be a start-up operation for starting a calibrating operation input by a user and received by the surround view controller 10 via the multimedia host 30 of the vehicle.

Step 102: controlling a plurality of surround view cameras to acquire images, and receiving a plurality of target photographs acquired by the plurality of surround view cameras, the plurality of target photographs including the preset pattern projected by the projection device of the vehicle on the ground around the vehicle.

In this step, the surround view controller in the panoramic surround view system may control the plurality of surround view cameras on the vehicle to acquire images, and receive a plurality of target photographs acquired by the plurality of surround view cameras, the plurality of target photographs including the preset pattern projected by the projection device of the vehicle on the ground around the vehicle.

Specifically, referring to FIG. 2, after receiving the projection instruction sent by the surround view controller 10, the projection device control module 20 may control the projection device 40 of the vehicle to project, so as to generate the preset pattern on the ground around the vehicle. Further, the surround view controller 10 may control the plurality of surround view cameras 50 on the vehicle to acquire images around the vehicle, so as to acquire the plurality of target photographs including the preset pattern projected by the projection device 40 of the vehicle on the ground around the vehicle.

In the embodiment of the present disclosure, the panoramic surround view system of the vehicle includes the plurality of surround view cameras, and a number of the plurality of surround view cameras is based on ensuring that 360-degree real-time images around the vehicle can be acquired, so that the panoramic surround view image obtained after calibrating and splicing according to the plurality of target photographs acquired by the plurality of surround view cameras is the 360-degree real-time image around the vehicle, and the user can use the panoramic surround view image to eliminate blind spots of vision, so that the parking process is safer and more convenient.

For example, the surround view cameras include four fisheye cameras installed at a front position of the vehicle and a parking place position of the vehicle and under left rearview mirror of the vehicle and under right rearview mirror of the vehicle, and shoot four images around a vehicle body at a same time. The target photographs taken by each fisheye camera include some preset patterns, and the target photographs obtained by splicing the target photographs taken by the four fisheye cameras after processing include all the preset patterns.

Figures 3, 4:
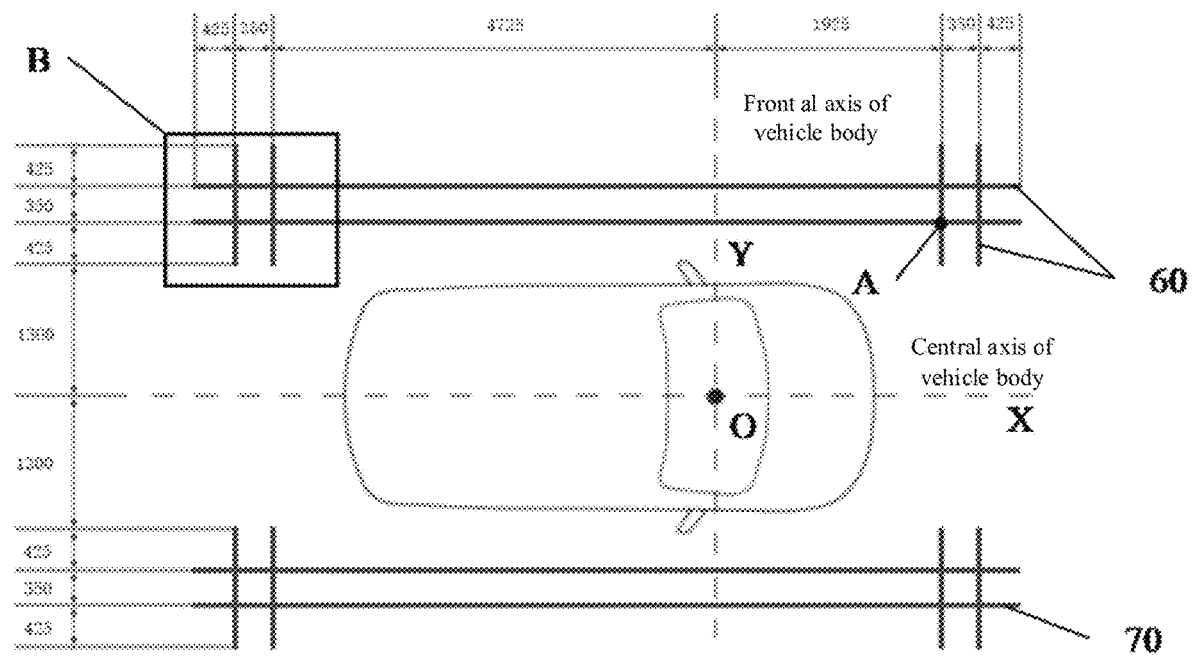
FIG. 3 is a schematic diagram of a preset pattern according to an embodiment of the present disclosure.
FIG. 4 is a flow chart of steps of another method for calibrating a panoramic surround view system according to an embodiment of the present disclosure.

Further, the preset pattern may be a pattern containing regular shapes such as straight lines, circular arcs and so on. Referring to FIG. 3, which illustrates a schematic diagram of the preset pattern according to an embodiment of the present disclosure. As shown in FIG. 3, the preset pattern 60 projected by the projection device of the vehicle on the ground around the vehicle includes a plurality of straight lines with intersection points, and the preset pattern 60 includes four straight lines with a length of 8,200 mm and a line width of 100 mm and parallel to an X axis, as well as eight straight lines with a length of 1,200 mm and a line width of 100 mm and parallel to a Y axis. It should be noted that the specific shape and size of the preset pattern 60 may be designed according to specific vehicle type parameters.

The projection device of the vehicle may be a laser light carried by the vehicle itself. Many vehicle models are equipped with laser lights under left and right rearview mirrors. Under certain conditions, vehicle brands, models and other logo information may be projected on the ground, but is only used as decoration. A laser light control module may control a current magnitude of the laser light after receiving the projection instruction sent by the surround view system, so as to control the laser light to project the preset pattern on the ground around the vehicle with a certain brightness and color.

Step 103: generating target calibrating data of the surround view cameras according to the plurality of target photographs.

In this step, the surround view controller in the panoramic surround view system may generate the target calibrating data of the surround view cameras according to the plurality of target photographs acquired by the plurality of surround view cameras.

Specifically, the target calibrating data may include external parameters of the surround view cameras, i.e., a transformation relationship between a camera coordinate system of the surround view camera and a ground coordinate system, which is namely a rotation matrix and a translation matrix of the camera coordinate system of the surround view camera relative to the ground coordinate system, so that coordinates of the preset pattern projected by the projection device of the vehicle on the ground around the vehicle in the ground coordinate system can be converted into coordinates of a plurality of pixels in the camera coordinate system according to the transformation relationship, so that the preset pattern can be accurately displayed in the panoramic surround view image, and the user can obtain information of the preset pattern projected by the projection device of the vehicle on the ground around the vehicle by observing the panoramic surround view image.

Referring to FIG. 3, the ground coordinate system O-xyz may be a coordinate system established by taking a ground plane where the vehicle is located as an XY plane, an intersection point O between a central axis of the vehicle body and a front axis of the vehicle body as an origin, a direction pointing to a head of the vehicle body along the central axis of the vehicle body as a positive direction of an X axis, and a direction pointing to a left side of the vehicle body along a front axis of the vehicle body as a positive direction of a Y axis. Coordinates of each straight line in the preset pattern and coordinates of the intersection points generated by the intersection of each straight line may be determined according to dimensions indicated in FIG. 3. For example, coordinates of a point A in the ground coordinate system are (1925,1725,0).

The camera coordinate system $O_w$-$x_w y_w z_w$ may be a coordinate system established with an optical center of the camera as an origin and an optical axis as a Z axis. If coordinates of any point in the ground coordinate system O-xyz are $(x_0, y_0, z_0)^T$, and coordinates of the point in the camera coordinate system of the surround view camera are $(x,y,z)^T$, then:

$$\begin{bmatrix} x \\ y \\ z \end{bmatrix} = R_0 \begin{bmatrix} x_0 \\ y_0 \\ z_0 \end{bmatrix} + t_0$$

wherein, $R_0$ is a rotation matrix of the camera coordinate system of the surround view camera relative to the ground coordinate system, and $t_0$ is a translation matrix of the camera coordinate system of the surround view camera relative to the ground coordinate system.

Therefore, coordinates of a certain pixel feature point in the target photographs in the camera coordinate system may be determined according to the target photographs acquired by the plurality of surround view cameras, and coordinates of the pixel feature point in the ground coordinate system may be determined according to the preset pattern set in advance, so that the rotation matrix and the translation matrix of the camera coordinate system of the surround view camera relative to the ground coordinate system can be determined, and the target calibrating data of the surround view cameras can be generated.

Step 104: calibrating and splicing the plurality of target photographs according to the target calibrating data to obtain a panoramic surround view image and complete a calibrating operation of the panoramic surround view system.

In this step, the surround view controller in the panoramic surround view system can calibrate the plurality of target photographs according to the target calibrating data determined in the above step, i.e., for the target photographs acquired by each surround view camera, the coordinates of the pixel points in the target photographs in the camera coordinate system are converted into the coordinates of the pixel points in the ground coordinate system according to the target calibrating data corresponding to the surround view camera. Further, according to a characteristic that the pixel feature points in the target photographs taken by adjacent surround view cameras overlap in the camera coordinate system, the target photographs taken by adjacent surround view cameras can be spliced, and seamless splicing of the images of the adjacent surround view cameras in the overlapped areas of the field of vision can be realized.

Further, the plurality of target photographs acquired by the surround view cameras are calibrated and spliced according to the target calibrating data, and finally a 360-degree real-time panoramic surround view image of the vehicle is obtained, thus completing the calibrating operation of the panoramic surround view system.

In conclusion, the method for calibrating the panoramic surround view system provided by an embodiment of the present disclosure is applied to the surround view controller in the panoramic surround view system, including: when receiving the calibrating start-up operation, generating the projection instruction, and sending the projection instruction to the projection device control module in the panoramic surround view system; controlling the plurality of surround view cameras to acquire images, and receiving the plurality of target photographs acquired by the plurality of surround view cameras, the plurality of target photographs including the preset pattern projected by the projection device of the vehicle on the ground around the vehicle; generating the target calibrating data of the surround view cameras according to the plurality of target photographs; and calibrating and splicing the plurality of target photographs according to the target calibrating data to obtain the panoramic surround view image and complete the calibrating operation of the panoramic surround view system. In the embodiment of the present disclosure, the panoramic surround view system in the vehicle can control the projection device of the vehicle to project the preset pattern on the ground around the vehicle, acquire the plurality of target photographs including the preset pattern, and generate the target calibrating data of the surround view cameras according to the plurality of target photographs, so that the surround view cameras of the panoramic surround view system can be calibrated by using the target calibrating data to obtain the panoramic surround view image. Therefore, when the user needs to re-calibrate the calibrating data of the image splicing of the panoramic surround view system of the vehicle, the calibrating process can be completed by only by using the projection device of the vehicle, without using a special calibrating site and equipment, thus simplifying the calibrating operation steps and saving time.

Referring to FIG. 4, which illustrates a flow chart of steps of another method for calibrating a panoramic surround view system according to an embodiment of the present disclosure.

The method for calibrating the panoramic surround view system provided by an embodiment of the present disclosure is applied to a projection device control module in the panoramic surround view system.

Step 201: when receiving a projection instruction sent by a surround view controller in the panoramic surround view system, controlling a projection device of a vehicle to project, and generating a preset pattern on the ground around the vehicle.

In this step, the projection device control module in the panoramic surround view system may, when receiving the projection instruction sent by the surround view controller, control the projection device of the vehicle to project, so as to generate the preset pattern on the ground around the vehicle, so that the preset pattern projected by the projection device of the vehicle on the ground around the vehicle may be included in the plurality of target photographs acquired by the surround view camera of the vehicle during image acquisition.

The projection device of the vehicle may be a laser light carried by the vehicle itself. Many vehicle models are equipped with laser lights under left and right rearview mirrors. Under certain conditions, vehicle brands, models and other logo information may be projected on the ground, but is only used as decoration. A laser light control module may control a current magnitude of the laser light after receiving the projection instruction sent by the surround view system, so as to control the laser light to project the preset pattern on the ground around the vehicle with a certain brightness and color.

Further, the preset pattern may be a pattern with regular shapes such as straight lines, circular arcs and so on, which is convenient for the surround view controller to generate the target calibrating data according to the preset pattern, so as to calibrate and splice the photographs acquired by the surround view cameras. The specific shape and size of the preset pattern may be designed according to specific vehicle type parameters.

In conclusion, the method for calibrating the panoramic surround view system provided by an embodiment of the present disclosure is applied to the projection device control module in the panoramic surround view system, including: when receiving the projection instruction sent by the surround view controller in the panoramic surround view system, controlling the projection device of the vehicle to project, and generate the preset pattern on the ground around the vehicle. In the embodiment of the present disclosure, the panoramic surround view system in the vehicle can control the projection device of the vehicle to project the preset pattern on the ground around the vehicle, acquire the plurality of target photographs including the preset pattern, and generate the target calibrating data of the surround view cameras according to the plurality of target photographs, so that the surround view cameras of the panoramic surround view system can be calibrated by using the target calibrating data to obtain the panoramic surround view image. Therefore, when the user needs to re-calibrate the calibrating data of the image splicing of the panoramic surround view system of the vehicle, the calibrating process can be completed by only by using the projection device of the vehicle, without using a special calibrating site and equipment, thus simplifying the calibrating operation steps and saving time.

Figure 5:
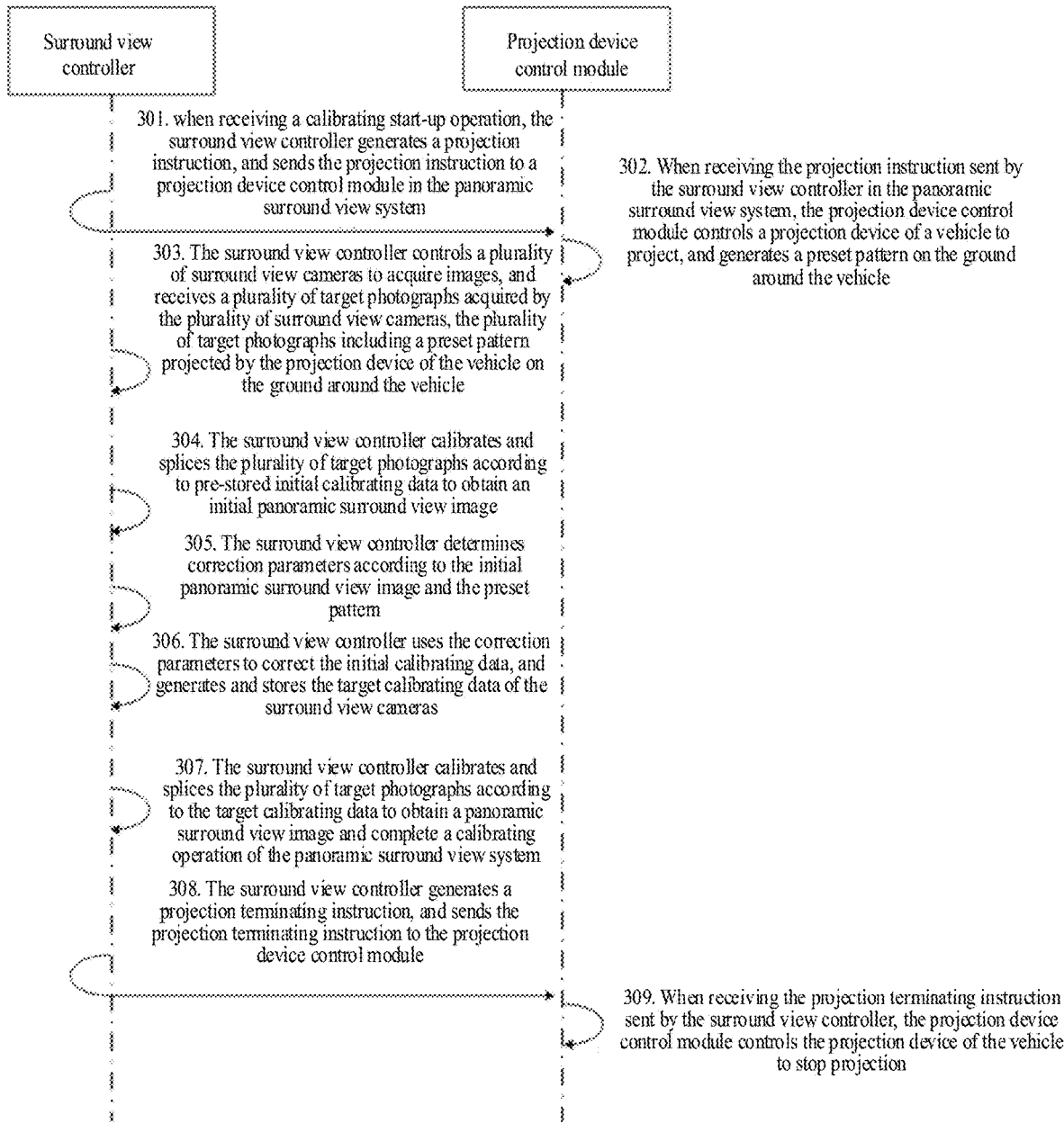
FIG. 5 is a flow chart of interactive steps of a method for calibrating a panoramic surround view system according to an embodiment of the present disclosure.

Referring to FIG. 5, which illustrates a flow chart of interactive steps of a method for calibrating a panoramic surround view system according to an embodiment of the present disclosure.

The method for calibrating the panoramic surround view system provided by an embodiment of the present disclosure is applied to a system for calibrating a panoramic surround view system including a surround view controller and a projection device control module.

Step 301: when receiving a calibrating start-up operation, the surround view controller generates a projection instruction, and sends the projection instruction to a projection device control module in the panoramic surround view system.

For the step, reference may be specifically made to the step 101 above, and details are not described herein again.

Optionally, the calibrating start-up operation includes: any one or more of a start-up operation specific to the calibrating operation input by a user, a start-up confirmation operation specific to the calibrating operation input by the user, and a start-up operation generated when a deformation quantity of the initial panoramic surround view image detected exceeds a preset deformation quantity.

Figure 6:
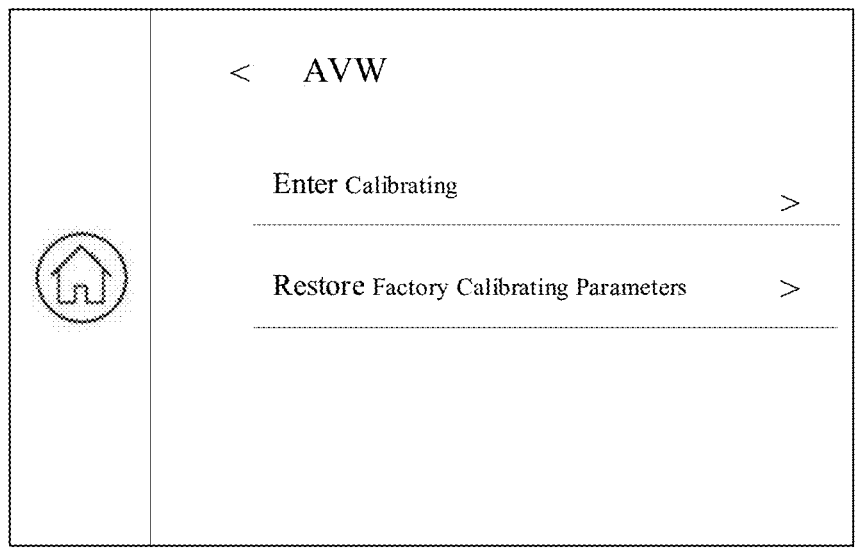
FIG. 6 is a schematic diagram of a calibrating start-up operation according to an embodiment of the present disclosure.

Specifically, the start-up operation specific to the calibrating operation input by the user may be a start-up operation for starting a calibrating operation input by the user via a multimedia host of the vehicle. For example, referring to FIG. 6, which illustrates a schematic diagram of the calibrating start-up operation described in the embodiment of the present disclosure. As shown in FIG. 6, there is an Around View Monitor (AVM) setting submenu under a setting option menu of the multimedia host of the vehicle. The user may start calibrating by clicking an "Enter Calibrating" option under the AVM submenu. In other words, the operation of the user clicking the "Enter Calibrating" option under the AVM submenu may be used as the start-up operation specific to the calibrating operation input by the user.

Figure 7:
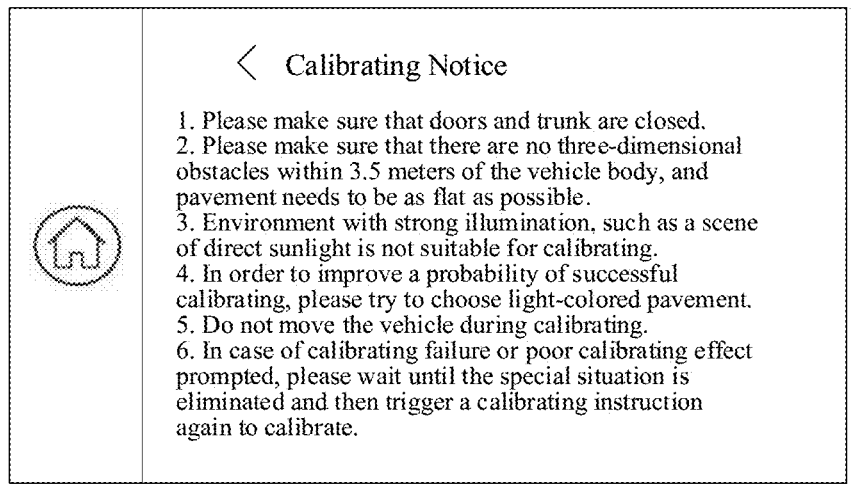
FIG. 7 is a schematic diagram of another calibrating start-up operation according to an embodiment of the present disclosure.

Further, the start-up confirmation operation specific to the calibrating operation input by the user may be a start-up confirmation operation for starting the calibrating operation input by the user via the multimedia host of the vehicle. For example, referring to FIG. 7, which illustrates a schematic diagram of another calibrating start-up operation described in the embodiment of the present disclosure. As shown in FIG. 7, there is an AVM setting submenu under a setting option menu of the multimedia host of the vehicle. The user may enter a "Calibrating Notice" interface by clicking the "Enter Calibrating" option under the AVM submenu. In this interface, various notices for vehicle calibrating are displayed. The user may start calibrating by clicking an "OK" button in the "Calibrating Notice" interface. In other words, the operation of the user clicking the "OK" button in the "Calibrating Notice" interface may be used as the start-up confirmation operation specific to the calibrating operation input by the user.

Furthermore, the vehicle may also automatically perform the calibrating operation according to a state of the vehicle. For example, when a posture of the vehicle changes, such as when a trunk of a pickup truck is full of goods, a suspension of the vehicle becomes low, resulting in overall lowering of the surround view cameras installed on the vehicle. As a result, reference objects such as objects around the vehicle or lines on the ground in the panoramic surround view image obtained by splicing the photographs acquired by the surround view cameras are severely deformed, resulting in poor splicing effect of the panoramic surround view image, which is impossible to provide accurate image information to a driver to assist the parking process, so it is necessary to temporarily re-calibrate the surround view cameras of the vehicle. Specifically, the panoramic surround view controller starts the calibrating operation when detecting that the deformation quantity of the reference objects in the initial panoramic surround view image exceeds the preset deformation quantity, that is, the start-up operation generated when the deformation quantity of the initial panoramic surround view image is detected to exceed the preset deformation quantity may be taken as the calibrating start-up operation Step 302: when receiving the projection instruction sent by the surround view controller in the panoramic surround view system, the projection device control module controls a projection device of a vehicle to project, and generates a preset pattern on the ground around the vehicle.

Optionally, the step may specifically include the following steps:

Sub-step 3021: the projection device control module receives environmental information of an environment in which the vehicle is located.

In this step, when receiving the projection instruction sent by the surround view controller in the panoramic surround view system, the projection device control module can receive the environmental information of the environment in which the vehicle is located detected by a sensor of the vehicle.

Specifically, the environmental information may include a brightness of the environment in which the vehicle is located detected by a light sensor in the vehicle.

Sub-step 3022: the projection device control module determines a target projection parameter corresponding to the environmental information according to a preset corresponding relationship between the environmental information and a projection parameter.

In this step, the projection device control module may determine the target projection parameter corresponding to the environmental information according to the preset corresponding relationship between the environmental information and the projection parameter.

Specifically, the projection parameter may include an output current and an output color of the projection device of the vehicle. In other words, the output current and the output color of the projection device of the vehicle corresponding to the brightness of the environment in which the vehicle is located detected by the light sensor in the vehicle may be determined according to the brightness of the environment in which the vehicle is located detected by the light sensor in the vehicle, so as to control a brightness and a color of the output light when the projection device of the vehicle projects, so that the brightness and the color when the projection device of the vehicle projects may be determined according to a brightness of a surrounding environment of the vehicle.

Sub-step 3023: the projection device control module controls the projection device of the vehicle to project according to the target projection parameter.

In this step, the projection device control module may control the projection device of the vehicle to project according to the target projection parameter determined in the above step.

For example, when the brightness of the surrounding environment of the vehicle is dark, the projection device of the vehicle may be controlled to project a white preset pattern at a lower brightness; when the surrounding environment of the vehicle is bright, the projection device of the vehicle may be controlled to project a red preset pattern at a higher brightness, so that the panoramic surround view system can recognize the brightness of the external environment by itself to control the projection device of the vehicle to project according to different environments, improve an acquisition efficiency of the surround view cameras on the preset pattern projected by the projection device of the vehicle, and improve a success rate of the surround view controller to generate the target calibrating data according to the target photographs acquired by the surround view cameras.

Step 303: the surround view controller controls a plurality of surround view cameras to acquire images, and receives a plurality of target photographs acquired by the plurality of surround view cameras, the plurality of target photographs including a preset pattern projected by the projection device of the vehicle on the ground around the vehicle.

For the step, reference may be specifically made to the step 102 above, and details are not described herein again.

Step 304: the surround view controller calibrates and splices the plurality of target photographs according to pre-stored initial calibrating data to obtain an initial panoramic surround view image.

In the embodiment of the present disclosure, the initial calibrating data includes: a transformation relationship between a ground coordinate system and a camera coordinate system, that is, a rotation matrix and a translation matrix of the camera coordinate system of the surround view cameras relative to the ground coordinate system, so that coordinates of the preset pattern projected by the projection device of the vehicle on the ground around the vehicle in the ground coordinate system can be converted into coordinates of a plurality of pixels in the camera coordinate system according to the transformation relationship.

In this step, the surround view controller may calibrate and splice the plurality of target photographs acquired by the plurality of surround view cameras according to the pre-stored initial calibrating data to obtain the initial panoramic surround view image.

The initial calibrating data may be calibrating data obtained by calibrating the surround view cameras of the vehicle with a special factory off-line calibrating apparatus when the vehicle leaves factory. If a posture of the vehicle or a position of the surround view camera does not change in the subsequent using process, the initial calibrating data may be used to calibrate and splice the plurality of target photographs acquired by the plurality of surround view cameras to obtain the initial panoramic surround view image, which may truly reflect the surrounding environment of the vehicle. However, if the posture of the vehicle or the position of the surround view camera changes, the initial panoramic surround view image obtained by using the initial calibrating data to calibrate and splice the plurality of target photographs acquired by the plurality of surround view cameras may produce more serious misalignment relative to the surrounding environment of the vehicle, and cannot provide the driver with accurate image information to assist the parking process through the initial panoramic surround view image.

Optionally, the step may specifically include the following steps:

Sub-step 3041: the surround view controller determines first coordinates of feature points in the plurality of target photographs in the camera coordinate system.

In this step, the surround view controller may determine the first coordinates of the feature points in the plurality of target photographs in the camera coordinate system first.

Figure 8:
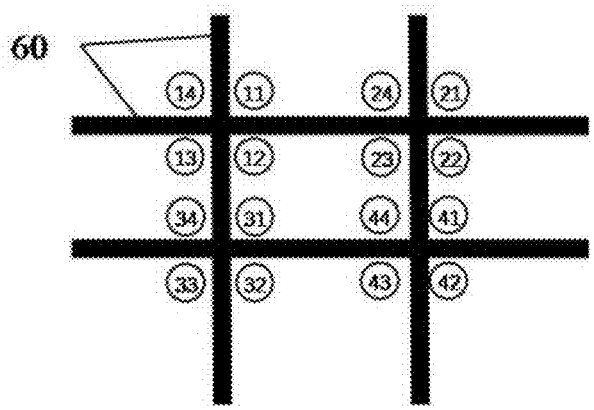
FIG. 8 is a schematic diagram of a target photograph according to an embodiment of the present disclosure.

Referring to FIG. 8, which illustrates a schematic diagram of a target photograph according to an embodiment of the present disclosure. The target photograph as shown in FIG. 8 corresponds to a B part of a preset pattern 60 projected by the projection device of the vehicle on the ground around the vehicle and acquired by the surround view camera installed under the left rearview mirror of the vehicle in FIG. 3, or the surround view camera installed at a rear side of the vehicle.

Specifically, the feature points may be each feature point on a straight line in the preset pattern 60 of the target photograph, and corner points generated by intersection of the straight lines. Further, coordinates of each feature point on the straight line may be determined, and first coordinates of a plurality of corner points in the target photograph in the camera coordinate system may be detected by a corner detection method. As shown in FIG. 8, the corner points generated by the intersection of the straight lines with line widths in the target photograph may include 16 corner points including 11, 12, 13, 14, or the like.

The corner detection method may be Harris, FAST, Moravec and other algorithms.

Sub-step 3042: the surround view controller calibrates the plurality of target photographs according to the transformation relationship between the ground coordinate system and the camera coordinate system, and determines second coordinates of the feature points in the ground coordinate system.

In this step, the surround view controller may calibrate the plurality of target photographs according to the transformation relationship between the ground coordinate system and the camera coordinate system, i.e., use the transformation relationship to determine the second coordinates of the feature points in the ground coordinate system according to the first coordinates of the feature points in the plurality of target photographs in the camera coordinate system.

For example, if the camera coordinate system is $O_w$-$x_w y_w z_w$, then the camera coordinate system may be a coordinate system established by taking an optical center of the camera as an origin and an optical axis as a Z axis. The ground coordinate system is O-xyz. The ground coordinate system may be a coordinate system established by taking a ground plane where the vehicle is located as an XY plane, an intersection point O between a central axis of the vehicle body and a front axis of the vehicle body as an origin, a direction pointing to a head of the vehicle body along the central axis of the vehicle body as a positive direction of an X axis, and a direction pointing to a left side of the vehicle body along a front axis of the vehicle body as a positive direction of a Y axis. Further, if first coordinates of a corner point 11 in the target photographs in the camera coordinate system are determined to be $(x,y,z)^T$ according to the target photographs, second coordinates of the corner point 11 in the ground coordinate system can be determined to be $(x_0,y_0,z_0)^T$ according to the transformation relationship between the ground coordinate system and the camera coordinate system, i.e., the rotation matrix $R_0$ of the camera coordinate system of the surround view camera relative to the ground coordinate system and the translation matrix $t_0$ of the camera coordinate system of the surround view camera relative to the ground coordinate system, wherein:

$$\begin{bmatrix} x \\ y \\ z \end{bmatrix} = R_0 \begin{bmatrix} x_0 \\ y_0 \\ z_0 \end{bmatrix} + t_0$$

Similarly, the second coordinates of each feature point on the straight line in the preset pattern in the ground coordinate system may also be determined by using the transformation relationship according to the first coordinates of each feature point on the straight line in the preset pattern in the target photographs in the camera coordinate system.

Sub-step 3043: the surround view controller splices the plurality of target photographs according to the second coordinates to obtain the initial panoramic surround view image.

In this step, the surround view controller may splice the plurality of target photographs acquired by the plurality of surround view cameras according to the second coordinates of the feature points in the ground coordinate system, and may splice the target photographs taken by the adjacent surround view cameras according to a characteristic that the pixel feature points in the target photographs taken by the adjacent surround view cameras overlap in the camera coordinate system, so as to realize seamless splicing of the images of the adjacent surround view cameras in the overlapped areas of the field of vision.

For example, referring to FIG. 3 and FIG. 8, both the surround view camera installed under the left rearview mirror of the vehicle and the surround view camera installed on the rear side of the vehicle can acquire the B part of the preset pattern 60 projected by the projection device of the vehicle on the ground around the vehicle, that is, the target photographs acquired by the surround view camera installed under the left rearview mirror of the vehicle and the surround view camera installed on the rear side of the vehicle contain the second coordinates corresponding to the B part. Therefore, when splicing the target photographs acquired by the surround view camera installed under the left rearview mirror of the vehicle and the surround view camera installed on the rear side of the vehicle, the pixel points in the photographs with the same second coordinates may be overlapped according to the second coordinates of the overlapped B part of the two target photographs, so as to complete the splicing of the target photographs and obtain the 360-degree initial panoramic surround view image around the vehicle.

Step 305: the surround view controller determines correction parameters according to the initial panoramic surround view image and the preset pattern.

Optionally, the step may specifically include the following steps:

Sub-step 3051: the surround view controller determines third coordinates of a target feature point which deviates from the preset pattern in the initial panoramic surround view image.

In this step, the surround view controller may determine the target feature point which deviates from the preset pattern in the initial panoramic surround view image according to the initial panoramic surround view image and the preset pattern, and further determine the third coordinates of the target feature point.

Specifically, referring to FIG. 3, if the preset pattern is a plurality of straight lines, it may be detected according to Hough transform detection method whether fit lines in the initial panoramic surround view image obtained by splicing the plurality of target photographs are a straight line. If it is detected that the fit lines are not a straight line, it is indicated that the initial panoramic surround view image obtained by using the initial calibrating data to calibrate and splice the plurality of target photographs acquired by the plurality of surround view cameras may produce more serious misalignment relative to the surrounding environment of the vehicle as the gesture of the vehicle or the position of the surround view camera in the initial panoramic surround view image changes, so that the target feature point which deviates from the preset pattern is generated.

Preferably, before determining that the target feature point which deviates from the preset pattern exists in the initial panoramic surround view image, the target photographs may be de-noised and binarized to remove interference information in the target photographs, so that the initial panoramic surround view image generated according to the target photographs retains the main features of the original image, and a quantity of information is also compressed greatly.

Sub-step 3052: the surround view controller adjusts the third coordinates of the target feature point to make the initial panoramic surround view image match the preset pattern, and determines adjusted values of the third coordinates of the target feature point in the adjusting process as the correction parameters.

In this step, the surround view controller may adjust the third coordinates of the target feature point with deviation in the initial panoramic surround view image to make the initial panoramic surround view image match the preset pattern, and determine the adjusted values of the third coordinates of the target feature point in the adjusting process as the correction parameters.

Specifically referring to FIG. 3, if the preset pattern is a plurality of straight lines, when detecting that the fit lines in the initial panoramic surround view image obtained after splicing the plurality of target photographs are not a straight line, positions of target feature points which are not on a same straight line in the initial panoramic surround view image are adjusted, such that the adjusted fit lines are called a straight line, and the adjusted values of the third coordinates of the target feature point in the adjusting process are determined as the correction parameters.

Preferably, a number of target feature points deviate from a straight line parallel to the X axis and a deviate pixel distance of the target feature points may be identified according to the surround view cameras installed under the left/right rearview mirrors of the vehicle. For example, if it is detected that there are n target feature points deviating from the straight line 70 in the initial panoramic surround view image along a negative direction of the Y axis, and one of the target feature points deviates one pixel in the negative direction of Y axis relative to the straight line 70, it is necessary to adjust the target feature point by one pixel in a positive direction of the Y axis; therefore, the correction parameter of the target feature point is to adjust by one pixel in the positive direction of the Y axis.

It should be noted that according to a proportional relationship between the initial panoramic surround view image and the preset pattern, a representative distance of one pixel in the ground coordinate system is determined to be s mm, which means that the deviate target feature point deviates s mm in the ground coordinate system.

Step 306: the surround view controller uses the correction parameters to correct the initial calibrating data, and generates and stores the target calibrating data of the surround view cameras.

In this step, the surround view controller may use the correction parameters to correct the initial calibrating data, and generate and store the target calibrating data of the surround view cameras.

Specifically, the surround view controller may correct external parameters of the surround view cameras in the initial calibrating data, i.e., the rotation matrix $R_0$ of the camera coordinate system of the surround view camera relative to the ground coordinate system and the translation matrix $t_0$ of the camera coordinate system of the surround view cameras relative to the ground coordinate system according to the correction parameters, and generate and store the target calibrating data $R_1$ and $t_1$ of the surround view cameras.

In the embodiment of the present disclosure, the target calibrating data and the initial calibrating data may be stored in a Double Data Rate Synchronous Dynamic Random Access Memory (DDR SDRAM) through a calibrating data storage module. DDR SDRAM has excellent transmission performances due to a data transmission speed thereof, and can quickly store and extract the target calibrating data.

Step 307: the surround view controller calibrates and splices the plurality of target photographs according to the target calibrating data to obtain a panoramic surround view image and complete a calibrating operation of the panoramic surround view system.

For the step, reference may be specifically made to the step 104 above.

Optionally, the step may specifically include the following steps:

Sub-step 3071: according to the target calibrating data, the surround view controller generates an application request specific to the target calibrating data;

In this step, the surround view controller may, according to the target calibrating data, generate the application request specific to the target calibrating data so as to prompt the user whether to apply the target calibrating data.

Sub-step 3072: the surround view controller sends the application request to a multimedia host in the panoramic surround view system for the multimedia host to show the application request, and when receiving a confirmation operation specific to the application request, the multimedia host generates an application confirmation instruction specific to the application request and sends the application confirmation instruction to the surround view controller.

In this step, the surround view controller may send the application request to the multimedia host in the panoramic surround view system for the multimedia host to display the application request, thus prompting the user whether to apply the target calibrating data.

Further, if the user selects to apply the target calibrating data according to the application request through the multimedia host, it is indicated that the user confirms the application request. Therefore, the multimedia host generates the application confirmation instruction specific to the application request and sends the application confirmation instruction to the surround view controller. If the user selects to not apply the target calibrating data according to the application request through the multimedia host, it is indicated that the user does not confirm the application request. Therefore, the multimedia host does not generate the application confirmation instruction specific to the application request.

Sub-step 3073: when receiving the application confirmation instruction, the surround view controller calibrates and splices the plurality of target photographs according to the target calibrating data.

In this step, if the surround view controller receives the application confirmation instruction, it is indicated that the user selects to apply the target calibrating data through the multimedia host. Therefore, the plurality of target photographs are calibrated and spliced according to the target calibrating data.

Sub-step 3074: when not receiving the application confirmation instruction, the surround view controller calibrates and splices the plurality of target photographs according to pre-stored initial calibrating data.

In this step, if the surround view controller does not receive the application confirmation instruction, it is indicated that the user selects to not apply the target calibrating data through the multimedia host. Therefore, the plurality of target photographs are calibrated and spliced according to the pre-stored initial calibrating data.

Step 308: the surround view controller generates a projection terminating instruction, and sends the projection terminating instruction to the projection device control module.

In this step, after calibrating and splicing the plurality of target photographs to obtain the panoramic surround view image and complete the calibrating operation of the panoramic surround view system, the surround view controller may generate the projection terminating instruction and send the projection terminating instruction to the projection device control module.

Step 309: when receiving the projection terminating instruction sent by the surround view controller, the projection device control module controls the projection device of the vehicle to stop projection.

In this step, after receiving the projection terminating instruction sent by the surround view controller, the projection device control module may stop supplying power to the laser light, so that the vehicle controls the projection device.

In conclusion, the method for calibrating the panoramic surround view system provided by an embodiment of the present disclosure includes: when receiving the calibrating start-up operation, generating the projection instruction, and sending the projection instruction to the projection device control module in the panoramic surround view system; controlling the plurality of surround view cameras to acquire images, and receiving the plurality of target photographs acquired by the plurality of surround view cameras, the plurality of target photographs including the preset pattern projected by the projection device of the vehicle on the ground around the vehicle; generating the target calibrating data of the surround view cameras according to the plurality of target photographs; and calibrating and splicing the plurality of target photographs according to the target calibrating data to obtain the panoramic surround view image and complete the calibrating operation of the panoramic surround view system. In the embodiment of the present disclosure, the panoramic surround view system in the vehicle can control the projection device of the vehicle to project the preset pattern on the ground around the vehicle, acquire the plurality of target photographs including the preset pattern, and generate the target calibrating data of the surround view cameras according to the plurality of target photographs, so that the surround view cameras of the panoramic surround view system can be calibrated by using the target calibrating data to obtain the panoramic surround view image. Therefore, when the user needs to re-calibrate the calibrating data of the image splicing of the panoramic surround view system of the vehicle, the calibrating process can be completed by only by using the projection device of the vehicle, without using a special calibrating site and equipment, thus simplifying the calibrating operation steps and saving time.

Moreover, when the projection device control module controls the projection device of the vehicle to project, the projection device of the vehicle may be controlled to project according to different environmental information, thus improving an acquisition efficiency of the surround view cameras on the preset pattern projected by the projection device of the vehicle, and improving a success rate of the surround view controller to generate the target calibrating data according to the target photographs acquired by the surround view cameras.

Figure 9:
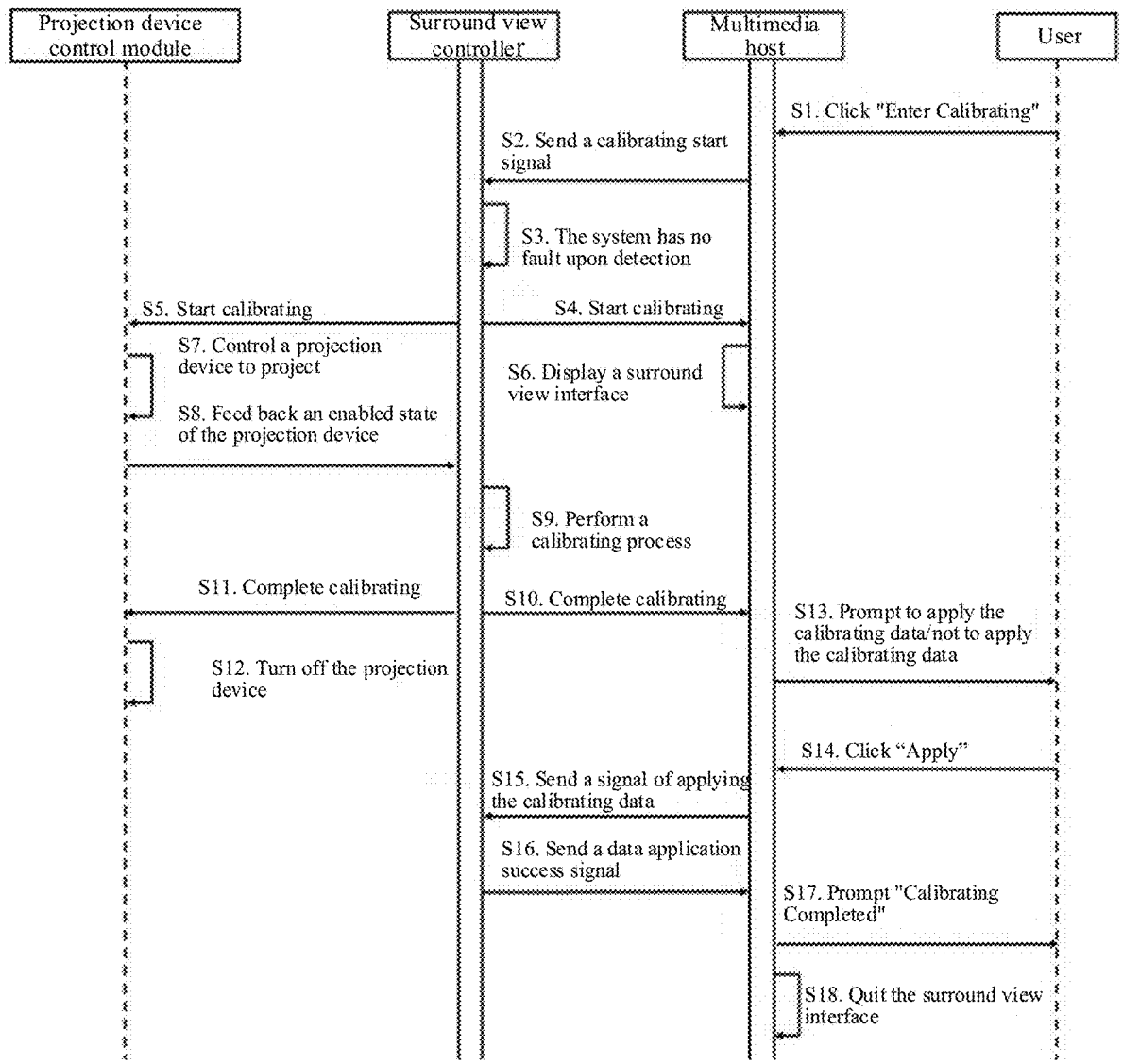
FIG. 9 is a flow chart of interactive steps of another method for calibrating a panoramic surround view system according to an embodiment of the present disclosure.

Referring to FIG. 9, which illustrates a flow chart of interactive steps of another method for calibrating a panoramic surround view system according to an embodiment of the present disclosure.

The method for calibrating the panoramic surround view system provided by an embodiment of the present disclosure is applied to a system for calibrating a panoramic surround view system including a surround view controller, a projection device control module and a multimedia host.

As step S1, a user clicks "Enter Calibrating".

In this step, the user may start calibrating by clicking the "Enter Calibrating" option under an AVM submenu under a setting option menu of the multimedia host of the vehicle.

At step S2, a calibrating signal is sent.

In this step, the multimedia host generates a calibrating start signal after detecting that the user clicks "Enter Calibrating", and sends the calibrating start signal to the surround view controller through s Controller Area Network (CAN) of the vehicle.

At step S3, the system has no fault upon detection.

In this step, after receiving the calibrating start signal, the surround view controller may perform fault detection before calibrating, including whether the surround view controller itself has faults, whether a projection control module of the vehicle has faults, or the like.

If a fault is detected in the system, the surround view controller sends a fault signal to the multimedia host. After receiving the fault signal, the multimedia host displays a prompt message of "System Fault Detected and Calibrating Unavailable" in a display interface of the multimedia host according to the fault signal, so as to prompt the user that the vehicle has a fault in this case and cannot perform a calibrating operation, and the multimedia host may return to a main interface after 2 seconds. If no fault is detected, steps S4 and S5 are executed, that is, the calibrating start signal is sent to the multimedia host and the projection device control module.

At step S4, the multimedia host is prompted to start calibrating.

At step S5, the projection device control module is prompted to start calibrating.

At step S6, a surround view interface is displayed.

In this step, after receiving the calibrating start signal, the multimedia host displays the surround view interface in the display interface of the multimedia host, i.e., displays a panoramic surround view image generated by the panoramic surround view system.

At step S7, a projection device is controlled to project.

In this step, after receiving the calibrating start signal, the projection device control module may control an input current of the projection device so as to perform projection.

At step S8, an enabled state of the projection device is fed back.

In this step, after controlling the projection device to project, the projection device control module may feed the enabled state of the projection device back to the surround view controller via the CAN of the vehicle.

At step S9, a calibrating process is performed.

In this step, after receiving the enabled state of the projection device, the surround view controller starts the calibrating process.

Figure 10:
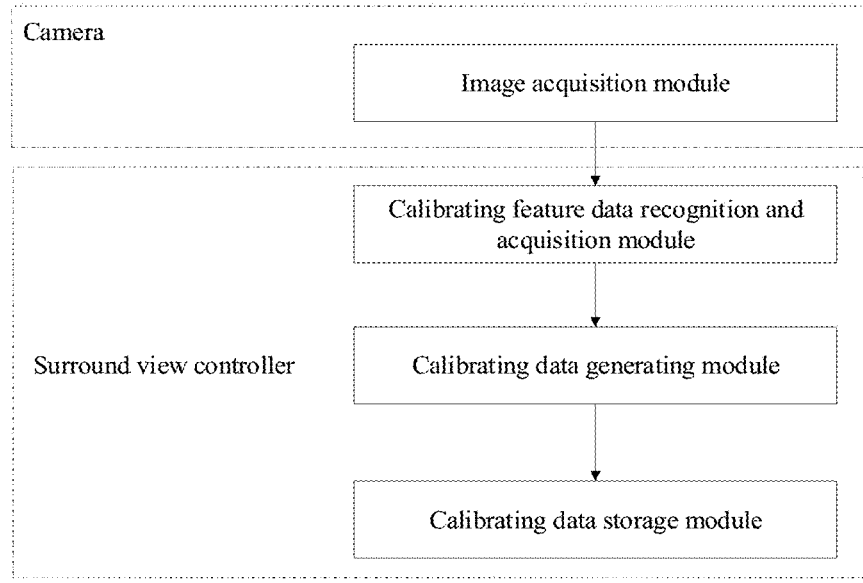
FIG. 10 is a structural drawing of a system for calibrating according to an embodiment of the present disclosure.

Specifically, the calibrating process may include the following steps:

(1) Image acquisition;

In this step, referring to FIG. 10, which illustrates a structural drawing of a calibrating system according to an embodiment of the present disclosure. As shown in FIG. 10, after receiving the enabled state of the projection device, the surround view controller may control an image acquisition module in the calibrating system to use four cameras in four directions of a vehicle body to shoot four images around the vehicle body at the same time, and the images contain pattern information projected by the projection device of the vehicle.

(2) Recognition and acquisition of calibrating feature data;

In this step, the four cameras in the four directions of the vehicle body may be fisheye cameras, and a straight line in the pattern information projected by the projection device of the vehicle is a curve in an original fisheye image of the fisheye camera, and becomes a straight line after being mapped from a top view.

Further, a calibrating feature data recognition and acquisition module in the calibrating system may respectively de-noise and binarize the four top views, extract the information of straight lines and intersection points of four straight lines from the four top views, and superimpose top views acquired by adjacent cameras, i.e., superimpose straight lines in the images, and superimpose intersection points of straight lines.

Further, Hough transform detection method may be used to detect whether fit lines after the superposition of the four top views are a straight line. If the fit lines are detected to be not on a straight line, a number of pixels deviating from the straight line and a deviating distance of the pixels are determined, and position of the pixels are adjusted, so that when the adjusted fitted lines are called a straight line, adjusted value of the pixels may be determined as correction parameters.

(3) Generation of calibrating data;

In this step, a calibrating data generating module in the calibrating system may generate calibrating data through an algorithm matrix according to external parameters of the fisheye cameras and the correction parameters. To ensure the efficiency of the calibrating process, this process is ensured to be completed within 10 seconds.

(4) Storage of calibrating data.

In this step, a calibrating data storage module in the calibrating system may save the generated calibrating data. At the same time, the calibrating data of the vehicle when leaving the factory is stored, and is also stored as the default calibrating data. The default calibrating data cannot be deleted during subsequent calibrating, so the default calibrating data may be restored if that the user is not satisfied with a calibrating effect.

At step S10, the multimedia host is prompted to complete calibrating.

In this step, after completing the calibrating process, the surround view controller may send a calibrating completion signal to the multimedia host, thus prompting the multimedia host to complete calibrating.

At step S11, the projection device control module is prompted to complete calibrating.

In this step, after completing the calibrating process, the surround view controller may send a calibrating completion signal to the projection device control module, thus prompting the projection device control module to complete calibrating.

At step S12, the projection device is turned off.

In this step, after receiving the calibrating completion signal, the projection device control module may turn off the projection device.

At step S13, it is prompt to apply the calibrating data/not to apply the calibrating data.

In this step, after receiving the calibrating completion signal, the multimedia host may prompt the user whether to apply the calibrating data in the display interface of the multimedia host. After the user clicks "Apply" or "Do Not Apply", the multimedia host sends a relevant signal to the surround view controller.

At step S14, the user clicks "Apply".

In this step, if the user needs to apply the calibrating data, the user may click "Apply", and the multimedia host sends a signal of applying the calibrating data to the surround view controller.

If the user does not need to apply the calibrating data, the user may click "Do Not Apply", and the multimedia host directly returns to the main interface.

At step S15, the signal of applying the calibrating data is sent.

In this step, the multimedia host sends the signal of applying the calibrating data to the surround view controller.

At step S16, a data application success signal is sent.

In this step, after receiving the signal of applying the calibrating data, the surround view controller applies the calibrating data and sends the data application success signal to the multimedia host after applying the calibrating data.

At step S17, "Calibrating Completed" is prompted.

In this step, after receiving the data application success signal, the multimedia host may display "Calibrating Completed" in the display interface of the multimedia host to prompt the user that this calibrating is completed, and then return to the main interface after 2 seconds, and the panoramic surround view image in this power-up period is displayed according to parameters of the calibrating data, so as to ensure a panoramic surround view effect.

At step S18, the surround view interface is quit.

In this step, after completing this calibrating, the multimedia host may quit the surround view interface automatically.

On the basis of the foregoing embodiments, an embodiment of the present disclosure further provides an apparatus for calibrating a panoramic surround view system.

Figure 11:
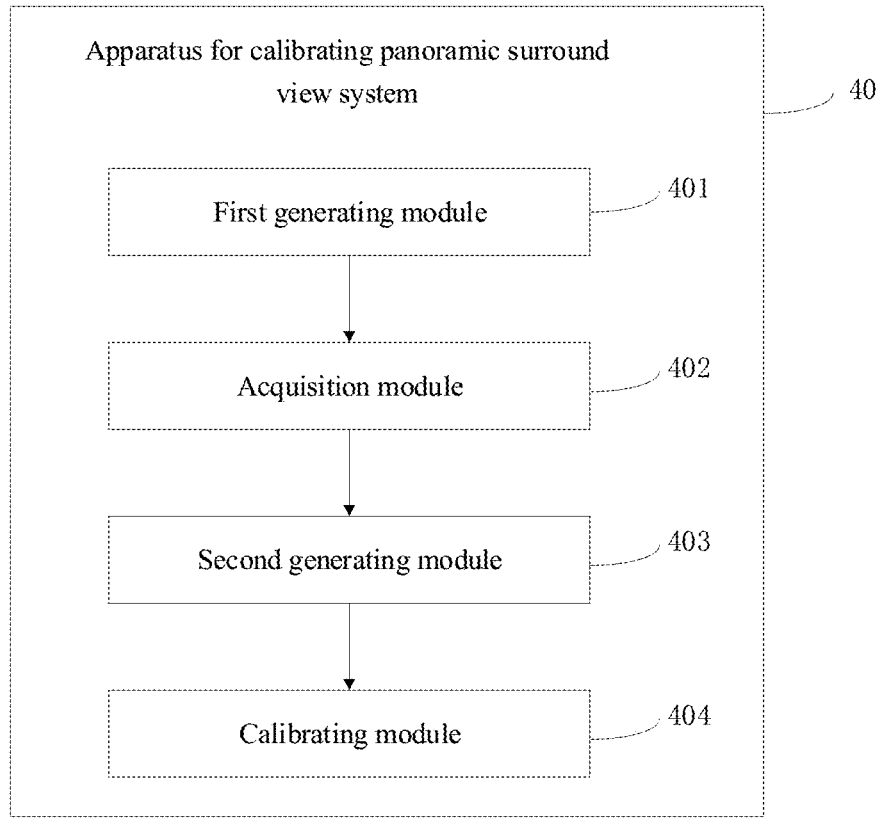
FIG. 11 is a structural block diagram of an apparatus for calibrating a panoramic surround view system according to an embodiment of the present disclosure.

Referring to FIG. 11, which illustrates a structural block diagram of an apparatus for calibrating a panoramic surround view system applied to a surround view controller according to an embodiment of the present disclosure, which may specifically include the following modules:

a first generating module 401 configured for, when receiving a calibrating start-up operation, generating a projection instruction, and sending the projection instruction to a projection device control module in the panoramic surround view system;

an acquisition module 402 configured for controlling a plurality of surround view cameras to acquire images, and receiving a plurality of target photographs acquired by the plurality of surround view cameras, the plurality of target photographs including a preset pattern projected by a projection device of a vehicle on the ground around the vehicle; and a second generating module 403 configured for generating target calibrating data of the surround view cameras according to the plurality of target photographs.

Optionally, the second generating module 403 specifically includes:

a first calibrating submodule configured for calibrating and splicing the plurality of target photographs according to pre-stored initial calibrating data to obtain an initial panoramic surround view image;

a first determining submodule configured for determining a correction parameter according to the initial panoramic surround view image and the preset pattern; and a first generating submodule configured for using the correction parameters to correct the initial calibrating data, and generating and storing the target calibrating data of the surround view cameras.

Optionally, the initial calibrating data includes: a transformation relationship between a ground coordinate system and a camera coordinate system; and the first calibrating submodule includes:

a first determining unit configured for determining first coordinates of feature points in the plurality of target photographs in the camera coordinate system;

a second determining unit configured for calibrating the plurality of target photographs according to the transformation relationship between the ground coordinate system and the camera coordinate system, and determining second coordinates of the feature points in the ground coordinate system; and a splicing unit configured for splicing the plurality of target photographs according to the second coordinates to obtain the initial panoramic surround view image.

Optionally, the first determining submodule includes:

a third determining unit configured for determining third coordinates of a target feature point which deviates from the preset pattern in the initial panoramic surround view image; and a fourth determining unit configured for adjusting the third coordinates of the target feature point to make the initial panoramic surround view image match the preset pattern, and determining adjusted values of the third coordinates of the target feature point in the adjusting process as the correction parameter.

The apparatus further includes a calibrating module 404 configured for calibrating and splicing the plurality of target photographs according to the target calibrating data to obtain a panoramic surround view image and complete a calibrating operation of the panoramic surround view system.

Optionally, the calibrating module 404 specifically includes:

a second generating submodule configured for, according to the target calibrating data, generating an application request specific to the target calibrating data;

a sending submodule configured for sending the application request to a multimedia host in the panoramic surround view system for the multimedia host to show the application request, and when receiving a confirmation operation specific to the application request, generating, by the multimedia host, an application confirmation instruction specific to the application request and sending the application confirmation instruction to the surround view controller;

a second calibrating submodule configured for, when receiving the application confirmation instruction, calibrating and splicing the plurality of target photographs according to the target calibrating data; and a third calibrating submodule configured for, when not receiving the application confirmation instruction, calibrating and splicing the plurality of target photographs according to the pre-stored initial calibrating data.

Optionally, the apparatus further includes:

a third generating module configured for generating a projection terminating instruction, and sending the projection terminating instruction to the projection device control module.

Optionally, the calibrating start-up operation includes: any one or more of a start-up operation specific to the calibrating operation input by a user, a start-up confirmation operation specific to the calibrating operation input by the user, and a start-up operation generated when a deformation quantity of the initial panoramic surround view image detected exceeds a preset deformation quantity.

In conclusion, the apparatus for calibrating the panoramic surround view system provided by the present application includes: when receiving the calibrating start-up operation, generating the projection instruction, and sending the projection instruction to the projection device control module in the panoramic surround view system; controlling the plurality of surround view cameras to acquire images, and receiving the plurality of target photographs acquired by the plurality of surround view cameras, the plurality of target photographs including the preset pattern projected by the projection device of the vehicle on the ground around the vehicle; generating the target calibrating data of the surround view cameras according to the plurality of target photographs; and calibrating and splicing the plurality of target photographs according to the target calibrating data to obtain the panoramic surround view image and complete the calibrating operation of the panoramic surround view system. In the embodiment of the present disclosure, the panoramic surround view system in the vehicle can control the projection device of the vehicle to project the preset pattern on the ground around the vehicle, acquire the plurality of target photographs including the preset pattern, and generate the target calibrating data of the surround view cameras according to the plurality of target photographs, so that the surround view cameras of the panoramic surround view system can be calibrated by using the target calibrating data to obtain the panoramic surround view image. Therefore, when the user needs to re-calibrate the calibrating data of the image splicing of the panoramic surround view system of the vehicle, the calibrating process can be completed by only by using the projection device of the vehicle, without using a special calibrating site and equipment, thus simplifying the calibrating operation steps and saving time.

Figure 12:
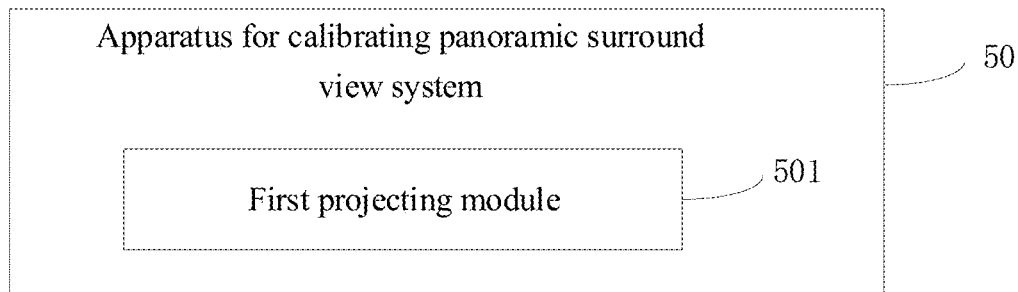
FIG. 12 is a structural block diagram of another apparatus for calibrating a panoramic surround view system according to an embodiment of the present disclosure.

Referring to FIG. 12, which illustrates a structural block diagram of an apparatus for calibrating a panoramic surround view system of a vehicle applied to a projection device control module according to an embodiment of the present disclosure, which may specifically include the following modules:

a first projecting module 501 configured for, when receiving a projection instruction sent by a surround view controller in the panoramic surround view system, controlling a projection device of a vehicle to project, and generating a preset pattern on the ground around the vehicle.

Optionally, the first projecting module 501 specifically includes:

a receiving submodule configured for environmental information of an environment in which the vehicle is located;

a second determining submodule configured for determining a target projection parameter corresponding to the environmental information according to a preset corresponding relationship between the environmental information and a projection parameter; and a projecting submodule configured for controlling the projection device of the vehicle to project according to the target projection parameter.

Optionally, the apparatus further includes:

a second projecting module configured for, when receiving the projection terminating instruction sent by the surround view controller, controlling the projection device of the vehicle to stop projection.

In conclusion, the apparatus for calibrating the panoramic surround view system provided by the present application includes: when receiving the projection instruction sent by the surround view controller in the panoramic surround view system, controlling the projection device of the vehicle to project, and generate the preset pattern on the ground around the vehicle. In the embodiment of the present disclosure, the panoramic surround view system in the vehicle can control the projection device of the vehicle to project the preset pattern on the ground around the vehicle, acquire the plurality of target photographs including the preset pattern, and generate the target calibrating data of the surround view cameras according to the plurality of target photographs, so that the surround view cameras of the panoramic surround view system can be calibrated by using the target calibrating data to obtain the panoramic surround view image. Therefore, when the user needs to re-calibrate the calibrating data of the image splicing of the panoramic surround view system of the vehicle, the calibrating process can be completed by only by using the projection device of the vehicle, without using a special calibrating site and equipment, thus simplifying the calibrating operation steps and saving time.

It can be clearly understood by those skilled in the art that, for the sake of convenience and brevity, a detailed working process of the foregoing system, apparatus, and unit may refer to a corresponding process in the foregoing method embodiments, and will not be elaborated herein.

The above-described apparatus embodiments are merely illustrative, wherein the units that are described as separate components may or may not be physically separate, and the components that are displayed as units may or may not be physical units; in other words, they may be located at the same one location, and may also be distributed to a plurality of network units. Part or all modules therein may be selected according to actual needs to realize the objective of achieving the technical solution of the embodiment. A person skilled in the art can understand and implement the technical solutions without paying creative work.

Each component embodiment of the present disclosure may be implemented by hardware, or by software modules that are operated on one or more processors, or by a combination thereof. A person skilled in the art should understand that some or all of the functions of some or all of the components of the computing-processing device according to the embodiments of the present disclosure may be implemented by using a microprocessor or a digital signal processor (DSP) in practice. The present disclosure may also be implemented as device or apparatus programs (for example, computer programs and computer program products) for implementing part of or the whole of the method described herein. Such programs for implementing the present disclosure may be stored in a computer-readable medium, or may be in the form of one or more signals. Such signals may be downloaded from an Internet website, or provided on a carrier signal, or provided in any other forms.

Figure 13:
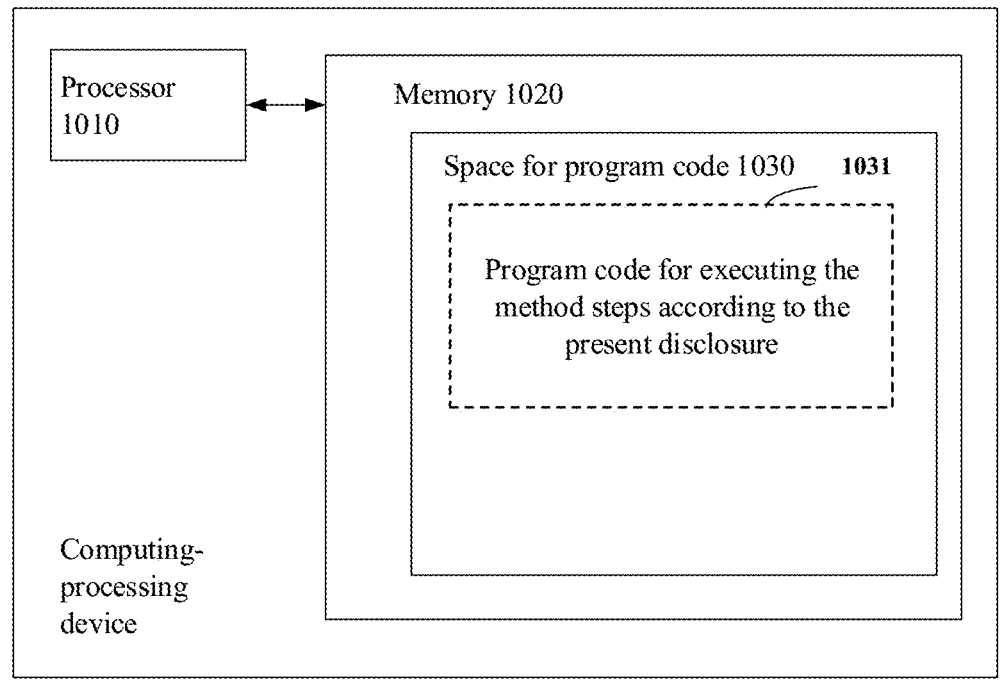
FIG. 13 schematically shows a block diagram of a computing-processing device for executing the method according to the present disclosure.
Figure 14:
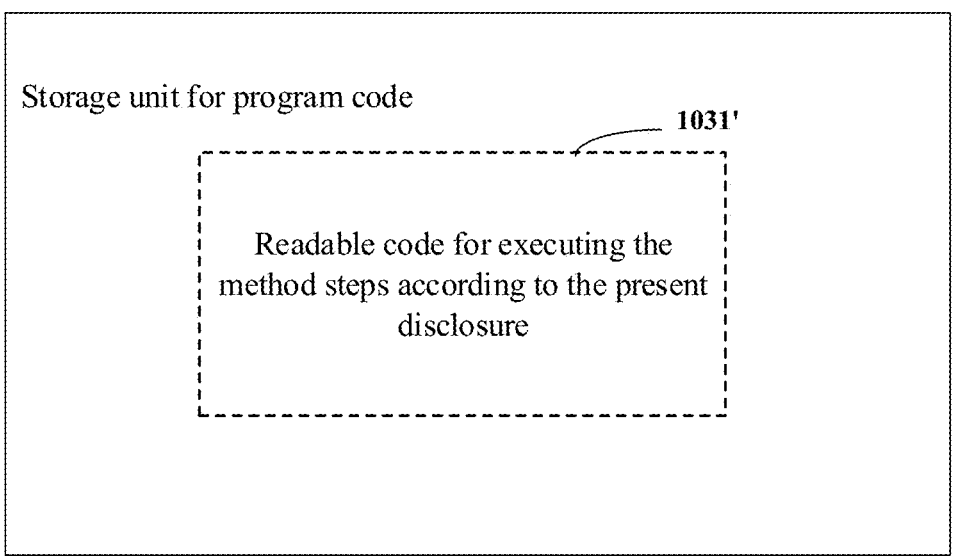
FIG. 14 schematically shows a storage unit for holding or carrying a program code for implementing the method according to the present disclosure.

For example, FIG. 13 shows a computing-processing device that can implement the method according to the present disclosure. The computing-processing device traditionally includes a processor 1010 and a computer program product or computer-readable medium in the form of a memory 1020. The memory 1020 may be electronic memories such as flash memory, EEPROM (Electrically Erasable Programmable Read Only Memory), EPROM, hard disk or ROM. The memory 1020 has a storage space 1030 of a program code 1031 for implementing any steps of the above method. For example, the storage space 1030 for program code may contain program codes 1031 for individually implementing each of the steps of the above method. Those program codes may be read from one or more computer program products or be written into the one or more computer program products. These computer program products include program code carriers such as hard disks, compact disks (CD), memory cards, or floppy disks. Such computer program products are usually portable or fixed storage units as shown in FIG. 14. The storage unit may have storage segments or storage spaces with similar arrangement to the memory 1020 of the computing-processing device in FIG. 13. The program codes may for example be compressed in a suitable form. Generally, the storage unit contains a computer-readable code 1031', which can be read by a processor like 1010. When those codes are executed by the computing-processing device, the codes cause the computing-processing device to implement each of the steps of the method described above.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

Many details are discussed in the specification provided herein. However, it can be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those apparatuses may be embodied by the same item of hardware. The words first, second, third and so on do not denote any order. Those words may be interpreted as names.

Those described above are merely preferred embodiments of the present disclosure, but are not intended to limit the present disclosure. Any modifications and equivalent substitutions and improvements made without departing from the principle of the present disclosure shall all fall within the protection scope of the present disclosure.

The foregoing descriptions are merely detailed embodiments of the present disclosure, but the protection scope of the present disclosure is not limited thereto. Any changes or substitutions that can be easily thought of by those familiar with the technical field within the technical scope disclosed in the present disclosure should be covered by the protection scope of the present disclosure. Therefore, the protection scope of the present disclosure should be subjected to the protection scope of the claims.

The invention claimed is:

1. A method for calibrating a panoramic surround view system applied to a surround view controller in the panoramic surround view system, wherein the method comprises:
   by one or more processors, when receiving a calibrating start-up operation, generating a projection instruction, and sending the projection instruction to a projection device control module in the panoramic surround view system;
   by one or more processors, controlling a plurality of surround view cameras to acquire images, and receiving a plurality of target photographs acquired by the plurality of surround view cameras, the plurality of target photographs comprising a preset pattern projected by a projection device of a vehicle on ground around the vehicle;

by one or more processors, generating target calibrating data of the surround view cameras according to the plurality of target photographs; and by one or more processors, calibrating and splicing the plurality of target photographs according to the target calibrating data to obtain a panoramic surround view image and complete a calibrating operation of the panoramic surround view system.

2. The method according to claim 1, wherein the step of generating the target calibrating data of the surround view cameras according to the plurality of target photographs specifically comprises:

calibrating and splicing the plurality of target photographs according to pre-stored initial calibrating data to obtain an initial panoramic surround view image;

determining correction parameters according to the initial panoramic surround view image and the preset pattern; and using the correction parameters to correct the initial calibrating data, and generating and storing the target calibrating data of the surround view cameras.

3. The method according to claim 2, wherein the initial calibrating data comprises:

a transformation relationship between a ground coordinate system and a camera coordinate system; and the step of calibrating and splicing the plurality of target photographs according to the pre-stored initial calibrating data to obtain the initial panoramic surround view image comprises:

determining first coordinates of feature points in the plurality of target photographs in the camera coordinate system;

calibrating the plurality of target photographs according to the transformation relationship between the ground coordinate system and the camera coordinate system, and determining second coordinates of the feature points in the ground coordinate system; and splicing the plurality of target photographs according to the second coordinates to obtain the initial panoramic surround view image.

4. The method according to claim 3, wherein the step of determining the correction parameters according to the initial panoramic surround view image and the preset pattern comprises:

determining third coordinates of a target feature point which deviates from the preset pattern in the initial panoramic surround view image; and adjusting the third coordinates of the target feature point to make the initial panoramic surround view image match the preset pattern, and determining adjusted values of the third coordinates of the target feature point in the adjusting process as the correction parameters.

5. The method according to claim 1, wherein, after the step of completing the calibrating operation of the panoramic surround view system, the method further comprises:

generating a projection terminating instruction, and sending the projection terminating instruction to the projection device control module.

6. The method according to claim 2, wherein the step of calibrating and splicing the plurality of target photographs according to the target calibrating data specifically comprises:

according to the target calibrating data, generating an application request specific to the target calibrating data;

sending the application request to a multimedia host in the panoramic surround view system for the multimedia host to show the application request, and when receiving a confirmation operation specific to the application request, generating, by the multimedia host, an application confirmation instruction specific to the application request and sending the application confirmation instruction to the surround view controller; and when receiving the application confirmation instruction, calibrating and splicing the plurality of target photographs according to the target calibrating data; and when not receiving the application confirmation instruction, calibrating and splicing the plurality of target photographs according to the pre-stored initial calibrating data.

7. The method according to claim 2, wherein the calibrating start-up operation comprises: any one or more of a start-up operation specific to the calibrating operation input by a user, a start-up confirmation operation specific to the calibrating operation input by the user, and a start-up operation generated when a deformation quantity of the initial panoramic surround view image detected exceeds a preset deformation quantity.

8. A system for calibrating a panoramic surround view system, comprising:

a surround view controller and a projection device control module, wherein the surround view controller and the projection device control module are in communication connection;

one or more processors and a storage apparatus; and wherein the storage apparatus stores a computer program which, when executed by the processor, perform the operations comprising:

when receiving a calibrating start-up operation, the surround view controller generates a projection instruction, and sends the projection instruction to a projection device control module in the panoramic surround view system;

when receiving the projection instruction sent by the surround view controller in the panoramic surround view system, the projection device control module controls a projection device of a vehicle to project, and generates a preset pattern on ground around the vehicle;

wherein the surround view controller controls a plurality of surround view cameras to acquire images, and receives a plurality of target photographs acquired by the plurality of surround view cameras, the plurality of target photographs comprising the preset pattern projected by the projection device of the vehicle on the ground around the vehicle;

wherein the surround view controller generates target calibrating data of the surround view cameras according to the plurality of target photographs; and wherein the surround view controller calibrates and splices the plurality of target photographs according to the target calibrating data to obtain a panoramic surround view image and complete a calibrating operation of the panoramic surround view system.

9. A computing-processing device, comprising:

a memory in which a computer-readable code is stored; and one or more processors, wherein when the computer-readable code is executed by the one or more processors, the computing-processing device executes the method for calibrating the panoramic surround view system according to claim 1.

10. A non-transitory computer-readable medium, wherein the computer-readable medium stores a computer-readable code, and when the computer-readable code is executed by a processor, a method for calibrating a panoramic surround view system according to claim 1 is performed.

11. The device according to claim 9, wherein the step of generating the target calibrating data of the surround view cameras according to the plurality of target photographs specifically comprises:

calibrating and splicing the plurality of target photographs according to pre-stored initial calibrating data to obtain an initial panoramic surround view image;

determining correction parameters according to the initial panoramic surround view image and the preset pattern; and using the correction parameters to correct the initial calibrating data, and generating and storing the target calibrating data of the surround view cameras.

12. The device according to claim 11, wherein the initial calibrating data comprises: a transformation relationship between a ground coordinate system and a camera coordinate system; and the step of calibrating and splicing the plurality of target photographs according to the pre-stored initial calibrating data to obtain the initial panoramic surround view image comprises:

determining first coordinates of feature points in the plurality of target photographs in the camera coordinate system;

calibrating the plurality of target photographs according to the transformation relationship between the ground coordinate system and the camera coordinate system, and determining second coordinates of the feature points in the ground coordinate system; and splicing the plurality of target photographs according to the second coordinates to obtain the initial panoramic surround view image.

13. The device according to claim 12, wherein the step of determining the correction parameters according to the initial panoramic surround view image and the preset pattern comprises:

determining third coordinates of a target feature point which deviates from the preset pattern in the initial panoramic surround view image; and adjusting the third coordinates of the target feature point to make the initial panoramic surround view image match the preset pattern, and determining adjusted values of the third coordinates of the target feature point in the adjusting process as the correction parameters.

14. The device according to claim 9, wherein after the step of completing the calibrating operation of the panoramic surround view system, the method further comprises:

generating a projection terminating instruction, and sending the projection terminating instruction to the projection device control module.

15. The device according to claim 11, wherein the step of calibrating and splicing the plurality of target photographs according to the target calibrating data specifically comprises:

according to the target calibrating data, generating an application request specific to the target calibrating data;

sending the application request to a multimedia host in the panoramic surround view system for the multimedia host to show the application request, and when receiving a confirmation operation specific to the application request, generating, by the multimedia host, an application confirmation instruction specific to the application request and sending the application confirmation instruction to the surround view controller; and when receiving the application confirmation instruction, calibrating and splicing the plurality of target photographs according to the target calibrating data; and when not receiving the application confirmation instruction, calibrating and splicing the plurality of target photographs according to the pre-stored initial calibrating data.

16. The device according to claim 11, wherein the calibrating start-up operation comprises: any one or more of a start-up operation specific to the calibrating operation input by a user, a start-up confirmation operation specific to the calibrating operation input by the user, and a start-up operation generated when a deformation quantity of the initial panoramic surround view image detected exceeds a preset deformation quantity.

* * * * *